(12) United States Patent
Yoshimi et al.

(10) Patent No.: US 9,701,174 B2
(45) Date of Patent: Jul. 11, 2017

(54) HYBRID VEHICLE

(71) Applicant: TOYOTA JIDOSHA KABUSHIKI KAISHA, Toyota-shi, Aichi-ken (JP)

(72) Inventors: Masashi Yoshimi, Toyota (JP); Takayuki Asami, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/107,620

(22) PCT Filed: Nov. 18, 2014

(86) PCT No.: PCT/JP2014/005775
§ 371 (c)(1),
(2) Date: Jun. 23, 2016

(87) PCT Pub. No.: WO2015/104741
PCT Pub. Date: Jul. 16, 2015

(65) Prior Publication Data
US 2016/0318371 A1    Nov. 3, 2016

(30) Foreign Application Priority Data

Jan. 10, 2014  (JP) .................................. 2014-003130

(51) Int. Cl.
*B60H 1/00*    (2006.01)
*B60K 11/08*   (2006.01)
*B60K 6/22*    (2007.10)

(52) U.S. Cl.
CPC ......... *B60H 1/00814* (2013.01); *B60H 1/004* (2013.01); *B60H 1/00428* (2013.01); *B60H 1/00735* (2013.01); *B60K 6/22* (2013.01); *B60K 11/085* (2013.01); *B60Y 2200/92* (2013.01); *B60Y 2300/51* (2013.01); *B60Y 2306/05* (2013.01); *B60Y 2400/88* (2013.01); *Y10S 903/904* (2013.01)

(58) Field of Classification Search
CPC .. B60H 1/0084; B60H 1/00814; B60H 1/004; B60H 1/00428; B60H 1/00651; B60H 1/00642; B60H 1/00735; B60H 2001/327; B60H 2001/3272–2001/3273; B60K 11/08–11/085; B60Y 2300/51; B60Y 2306/05
See application file for complete search history.

(56) References Cited

U.S. PATENT DOCUMENTS

| | | | | |
|---|---|---|---|---|
| 3,759,054 A | * | 9/1973 | Graber | ................. B60H 1/3227 165/271 |
| 3,759,056 A | * | 9/1973 | Graber | ................. B60H 1/3227 165/271 |

(Continued)

FOREIGN PATENT DOCUMENTS

| | | |
|---|---|---|
| CN | 103167965 A | 6/2013 |
| JP | 2011-105219 | 6/2011 |

(Continued)

*Primary Examiner* — Erez Gurari
(74) *Attorney, Agent, or Firm* — Finnegan, Henderson, Farabow, Garrett & Dunner, LLP

(57) ABSTRACT

A hybrid vehicle includes a control unit. The control unit limits an output of an electrically powered compressor included in an air conditioner when a shutter has a closed failure in which the shutter cannot be set to an opened state.

3 Claims, 2 Drawing Sheets

(56) References Cited

U.S. PATENT DOCUMENTS

| | | | | |
|---|---|---|---|---|
| 4,794,537 A | * | 12/1988 | Adasek | B60H 1/00814 |
| | | | | 237/5 |
| 5,782,102 A | * | 7/1998 | Iritani | B60H 1/00021 |
| | | | | 62/197 |
| 2011/0118945 A1 | | 5/2011 | Mochizukii | |
| 2012/0074729 A1 | | 3/2012 | Fenchak et al. | |
| 2013/0046445 A1 | * | 2/2013 | Nishimura | B60H 1/3208 |
| | | | | 701/49 |
| 2013/0184943 A1 | | 7/2013 | Sato et al. | |
| 2014/0299077 A1 | * | 10/2014 | Sowards | F01P 7/10 |
| | | | | 123/41.05 |
| 2015/0149043 A1 | * | 5/2015 | Macfarlane | F01P 7/12 |
| | | | | 701/49 |
| 2016/0339760 A1 | * | 11/2016 | Dunn | B60H 1/00278 |
| 2016/0361990 A1 | * | 12/2016 | Porras | B60K 11/04 |
| 2016/0368366 A1 | * | 12/2016 | Miller | F01P 7/12 |

FOREIGN PATENT DOCUMENTS

| | | |
|---|---|---|
| KR | 10-2011-0093102 A | 8/2011 |
| KR | 10-2013-0065138 A | 6/2013 |
| WO | WO 2012/029521 A1 | 3/2012 |

* cited by examiner

HYBRID VEHICLE

CROSS-REFERENCE TO RELATED APPLICATIONS

This application is a national phase application of International Application No. PCT/JP2014/005775, filed Nov. 18, 2014, and claims the priority of Japanese Application No. 2014-003130, filed Jan. 10, 2014, the content of both of which is incorporated herein by reference.

TECHNICAL FIELD

The present invention relates to a hybrid vehicle, and in particular to control of a hybrid vehicle when a grille shutter fails to operate.

BACKGROUND ART

In recent years, hybrid vehicles equipped with an engine and a traveling motor as drive sources are practically used.

In a hybrid vehicle, heat is generated at an engine, a traveling motor, and the like. Heat is released from the engine, the traveling motor, and the like by cooling a radiator.

The radiator is arranged, for example, in a vehicle body inner space (within an engine compartment) equipped with the engine. The radiator is cooled by taking in air outside the vehicle (outside air) into the engine compartment. Taking-in of the outside air is performed, for example, through a grille shutter provided at a vent for taking in the outside air into the engine compartment. The grille shutter is configured to be openable and closable.

Japanese Patent Laying-Open No. 2011-105219 proposes detecting a failure or notifying a failure when a grille shutter fails to operate.

CITATION LIST

Patent Literature

PTL 1: Japanese Patent Laying-Open No. 2011-105219
PTL 2: WO 2012/029521

SUMMARY OF INVENTION

Technical Problem

In a hybrid vehicle, electric power of a battery is used not only to drive a traveling motor, but also to drive an electrically powered compressor of an air conditioning device (air conditioner). Further, a hybrid vehicle may perform a control such that, when a remaining capacity (SOC: State Of Charge) of a battery decreases, an engine is started, a power generator is driven by the engine, and thereby the battery is charged.

In such a hybrid vehicle, when an air conditioner is used, that is, an electrically powered compressor is driven, in a case where a grille shutter is fixed in a closed state and cannot shift to an opened state (i.e., the grille shutter has a closed failure), the following problem may occur. Namely, the SOC of a battery decreases by using the air conditioner, and an engine is started to charge the battery, generating heat. Since the grille shutter cannot shift to an opened state even though the engine generates heat, the temperature within an engine compartment increases. When the temperature within the engine compartment increases, outputs of the engine, the traveling motor, and the like may be limited, for example by activation of a protection function.

One object of the present invention is to make it possible to suppress an increase in the temperature within an engine compartment while operating an air conditioner in a hybrid vehicle, even in a case where a grille shutter has the closed failure.

Solution to Problem

In summary, the present invention is directed to a hybrid vehicle equipped with an engine, a motor, and a power generator, including: a battery which is charged by the engine driving the power generator when a remaining capacity decreases; an engine compartment which accommodates the engine and the motor; a shutter which is provided at a vent for taking in air from outside of the hybrid vehicle into the engine compartment, and which is openable and closable; an air conditioner which includes an electrically powered compressor driven by receiving electric power from the battery; and a control unit which limits an output of the electrically powered compressor when the shutter has the closed failure in which the shutter cannot be set to an opened state.

In the hybrid vehicle configured as described above, when the shutter can be set to an opened state, an increase in the temperature within the engine compartment is suppressed by taking in outside air into the engine compartment. On the other hand, when the shutter has the closed failure, the output of the electrically powered compressor is limited. When the output of the electrically powered compressor is limited, power consumption of the electrically powered compressor decreases, and the SOC of the battery is suppressed from decreasing. When the SOC of the battery is suppressed from decreasing, opportunities that the power generator is driven by the engine in order to charge the battery are decreased. As a result, the possibility that the temperature within the engine compartment increases due to heat generation by the engine is also decreased.

Preferably, the air conditioner further includes a coolant. When the coolant has a pressure higher than a first predetermined value, the control unit decreases the output of the electrically powered compressor. When the coolant has a pressure higher than a second predetermined value, the control unit stops the electrically powered compressor. The second predetermined value is higher than the first predetermined value.

The pressure of the coolant for the air conditioner may vary in response to the closed failure of the shutter. According to the above configuration, control over the closed failure of the shutter, that is, limitation on the output of the electrically powered compressor, is performed based on the pressure of the coolant for the air conditioner. Further, according to the above configuration, the output of the electrically powered compressor is limited in a stepwise manner based on two thresholds, that is, the first predetermined value and the second predetermined value.

Preferably, the control unit limits a rotational speed of the electrically powered compressor when the shutter has the closed failure.

When the rotational speed of the electrically powered compressor is limited, power consumption of the electrically powered compressor also decreases.

Advantageous Effects of Invention

According to the present invention, it is possible to suppress an increase in the temperature within an engine compartment while operating an air conditioner in a hybrid vehicle, even in a case where the grille shutter has the closed failure.

DESCRIPTION OF EMBODIMENTS

Figure 1:
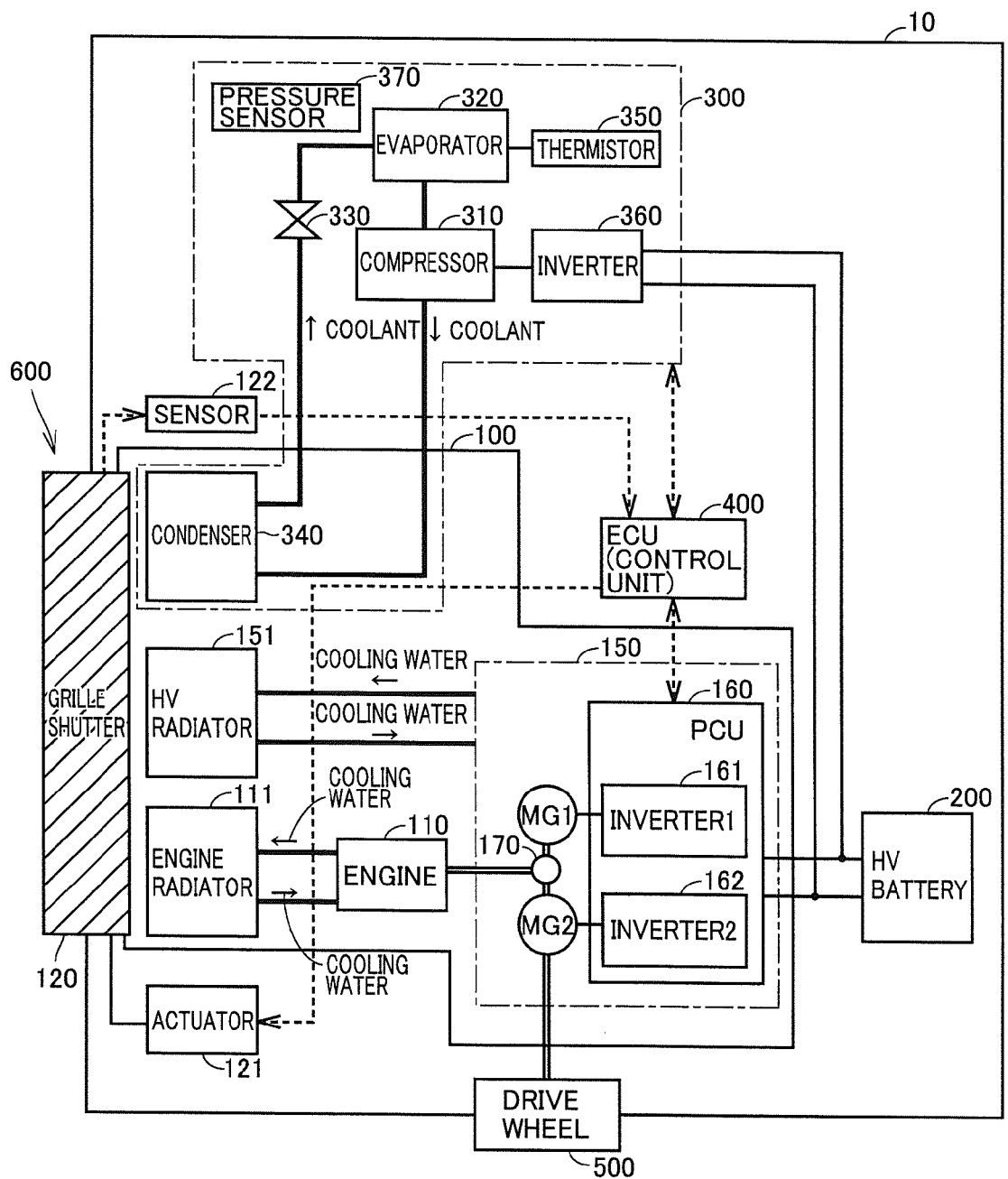
FIG. 1 is a view for illustrating a schematic configuration of a hybrid vehicle 10 in accordance with an embodiment.

Hereinafter, an embodiment of the present invention will be described in detail with reference to the drawings. It is noted that identical or corresponding parts in the drawings will be designated by the same reference numerals, and the description thereof will not be repeated.

FIG. 1 is a view for illustrating a schematic configuration of a hybrid vehicle 10 in accordance with an embodiment.

Referring to FIG. 1, hybrid vehicle 10 includes an engine compartment 100, an HV (Hybrid Vehicle) battery 200, an air conditioner unit 300, an ECU 400, drive wheels 500, and a vent 600.

Engine compartment 100 is a vehicle body inner space of hybrid vehicle 10. Engine compartment 100 accommodates an engine 110 and an engine radiator 111.

Engine 110 is an internal combustion engine which generates a drive force. Engine 110 generates heat when it generates the drive force. Engine 110 is cooled with cooling water. This cooling water circulates between engine 110 and engine radiator 111.

Engine radiator 111 is a heat exchanger which performs heat exchange between the cooling water for engine 110 and outside air, and cools the cooling water.

Engine compartment 100 further accommodates an electrically powered driving unit 150. Electrically powered driving unit 150 includes a power control unit (PCU) 160, motor generators MG1 and MG2, and a motive power split device 170.

Motor generators MG1 and MG2 receive electric power from PCU 160 and generate drive forces. Motor generators MG1 and MG2 can also generate electric power using the drive force of engine 110. Further, motor generators MG1 and MG2 can also generate electric power using regenerative energy when hybrid vehicle 10 performs regenerative braking.

PCU 160 converts electric power of HV battery 200 (described later) into electric power for driving motor generators MG1 and MG2. PCU 160 can also convert electric power from motor generators MG1 and MG2 into charging power for HV battery 200.

Motive power split device 170 splits motive power from engine 110, and transmits the split motive power to each of motor generators MG1 and MG2.

PCU 160 includes an inverter 161 and an inverter 162. Inverter 161 is used for electric power conversion between motor generator MG1 and HV battery 200. Inverter 162 is used for electric power conversion between motor generator MG2 and HV battery 200.

Electrically powered driving unit 150 including PCU 160 and motor generators MG1 and MG2 generates heat. Thus, electrically powered driving unit 150 is cooled with cooling water. This cooling water circulates between electrically powered driving unit 150 and an HV (Hybrid Vehicle) radiator 151.

HV radiator 151 is a heat exchanger which performs heat exchange between the cooling water for electrically powered driving unit 150 and the outside air, and cools the cooling water.

Engine compartment 100 is further equipped with a condenser 340. Condenser 340 is a heat exchanger which performs heat exchange between a coolant for air conditioner unit 300 and the air outside hybrid vehicle 10, and cools the coolant.

Further, engine compartment 100 includes a grille shutter 120, an actuator 121, and a sensor 122. Grille shutter 120 is provided at vent 600 (described later).

Grille shutter 120 is configured such that it can be switched between an opened state and a closed state. When grille shutter 120 is set to an opened state, for example, the air outside hybrid vehicle 10 (outside air) can be taken in into engine compartment 100. Further, when grille shutter 120 is set to a closed state, for example, an aerodynamic force during traveling can be improved (for example, air resistance can be reduced).

Actuator 121 opens and closes grille shutter 120. Sensor 122 senses whether grille shutter 120 is in an opened state or a closed state.

HV battery 200 is a power storage device configured to be chargeable and dischargeable. HV battery 200 is configured to include, for example, a secondary battery such as a lithium ion battery, a nickel hydride battery, a lead storage battery, or the like, or a power storage element such as an electric double layer capacitor.

In hybrid vehicle 10, HV battery 200 is charged as necessary. As an example, when the SOC of HV battery 200 decreases, engine 110 drives motor generator MG1, and motor generator MG1 generates electric power. The electric power generated by motor generator MG1 is converted by PCU 160 into the charging power for HV battery 200. Thereby, HV battery 200 is charged, and the SOC of HV battery 200 is maintained or increased.

Air conditioner unit 300 includes a compressor 310, an evaporator 320, an expansion valve 330, condenser 340, a thermistor 350, an inverter 360, and a pressure sensor 370.

Air conditioner unit 300 can perform a cooling operation, a heating operation, and the like. Air conditioner unit 300 uses a coolant (for example, a coolant gas).

For example, in the cooling operation, the coolant is emitted through expansion valve 330 into evaporator 320. The temperature of evaporator 320 is decreased by the coolant emitted into evaporator 320. Thereby, the cooling function of evaporator 320 is exhibited. Air conditioner unit 300 performs the cooling operation using the cooling function of evaporator 320.

The coolant emitted into evaporator 320 is thereafter compressed by compressor 310, and transported to condenser 340. The coolant transported to condenser 340 is cooled by the function of condenser 340 as a heat exchanger. Thereafter, the coolant is emitted again through expansion valve 330 into evaporator 320.

It is noted that the heating operation is performed by switching the direction of an output of compressor 310 to a direction opposite to the direction for the cooling operation. This switching is implemented, for example, by providing compressor 310 with a four-way valve not shown.

In hybrid vehicle 10, compressor 310 included in air conditioner unit 300 is an electrically powered compressor which operates using electric energy. Specifically, compressor 310 operates by receiving alternating current electric power from inverter 360. Typically, compressor 310 is an electrically powered rotary compressor.

When the output (rotational speed) of compressor 310 increases, the cooling function and the heating function (cooling/heating functions) of air conditioner unit 300 are improved, whereas power consumption of compressor 310 increases. On the other hand, when the output of compressor 310 decreases, the cooling/heating functions of air conditioner unit 300 declines, whereas power consumption of compressor 310 decreases.

Thermistor 350 is used to detect the temperature of evaporator 320.

Inverter 360 converts direct current electric power from HV battery 200 into alternating current electric power, and outputs the alternating current electric power to compressor 310. Namely, electric power to be consumed by compressor 310 is supplied by HV battery 200.

Pressure sensor 370 detects the pressure of the coolant which flows through air conditioner unit 300. The pressure of the coolant is measured, for example, at a position before or after compressor 310 or before or after expansion valve 330 at which the pressure of the coolant changes relatively significantly.

It is noted that, although only condenser 340 of air conditioner unit 300 is shown in FIG. 1 to be included in engine compartment 100, the present invention is not limited to such a configuration. For example, air conditioner unit 300 itself may be included in engine compartment 100.

ECU 400 includes a CPU (Central Processing Unit), a storage device, and an input/output buffer which are not shown. ECU 400 receives a signal from each sensor or the like, outputs a control signal to each device, and controls hybrid vehicle 10 and each device. It is noted that such control can be performed not only by processing with software but also by processing with dedicated hardware (electronic circuitry).

Drive wheels 500 are used for traveling of hybrid vehicle 10. Drive wheels 500 are driven by motor generator MG2.

Vent 600 is provided to take in the air from the outside of hybrid vehicle 10.

In hybrid vehicle 10, grille shutter 120 may fail to operate. Examples of failures include a closed failure in which grille shutter 120 is fixed in a closed state and cannot be set to an opened state, and an opened failure in which grille shutter 120 is conversely fixed in the opened state and cannot be set to the closed state.

When air conditioner unit 300 operates, that is, compressor 310 operates, in a case where grille shutter 120 has the closed failure, the following problem may occur. Namely, when compressor 310 operates and the electric power of HV battery 200 is consumed, the SOC of HV battery 200 decreases. When the SOC of HV battery 200 decreases, engine 110 is started to charge HV battery 200. However, when engine 110 is started, engine 110 generates heat. On this occasion, since grille shutter 120 cannot be set to the opened state, the temperature within engine compartment 100 increases. When the temperature within engine compartment 100 increases, outputs of engine 110, motor generators MG1 and MG2, and the like may be limited, for example by activation of a protection function.

Accordingly, in the present embodiment, when the grille shutter has the closed failure, the output of compressor 310 of air conditioner unit 300 is limited.

When the output of compressor 310 is limited, the SOC of HV battery 200, which supplies the electric power to be consumed by compressor 310, is suppressed from decreasing. When the SOC of HV battery 200 is suppressed from decreasing, opportunities that motor generator MG1 is driven by engine 110 in order to charge HV battery 200 are also decreased. As a result, the possibility that the temperature within engine compartment 100 increases due to heat generation by engine 110 is also decreased.

Further, in the embodiment, the output of compressor 310 is limited based on the pressure of the coolant which flows through air conditioner unit 300. Specifically, when the coolant has a pressure higher than a first predetermined value, the output of compressor 310 is decreased (from a rated magnitude). Further, when the coolant has a pressure higher than a second predetermined value, compressor 310 is stopped. The second predetermined value is set to be higher than the first predetermined value.

When grille shutter 120 has the closed failure and cooling of condenser 340 is not fully performed, the pressure of the coolant which flows through air conditioner unit 300 tends to increase. Therefore, by limiting the output of compressor 310 in a stepwise manner based on the pressure of the coolant, a decrease in the SOC of HV battery 200 can be suppressed, and thus, an increase in the temperature within engine compartment 100 due to heat generation by engine 110 can be suppressed.

The output of compressor 310 is limited, for example, by limiting the rotational speed of compressor 310.

The output of compressor 310 may also be limited by intermittently operating compressor 310.

The operation of hybrid vehicle 10 in the embodiment as described above is implemented by control unit 400 controlling each element of hybrid vehicle 10.

According to hybrid vehicle 10 in accordance with the present embodiment, it is possible to suppress an increase in the temperature within engine compartment 100 while operating air conditioner unit 300, even in a case where grille shutter 120 has the closed failure.

Figure 2:
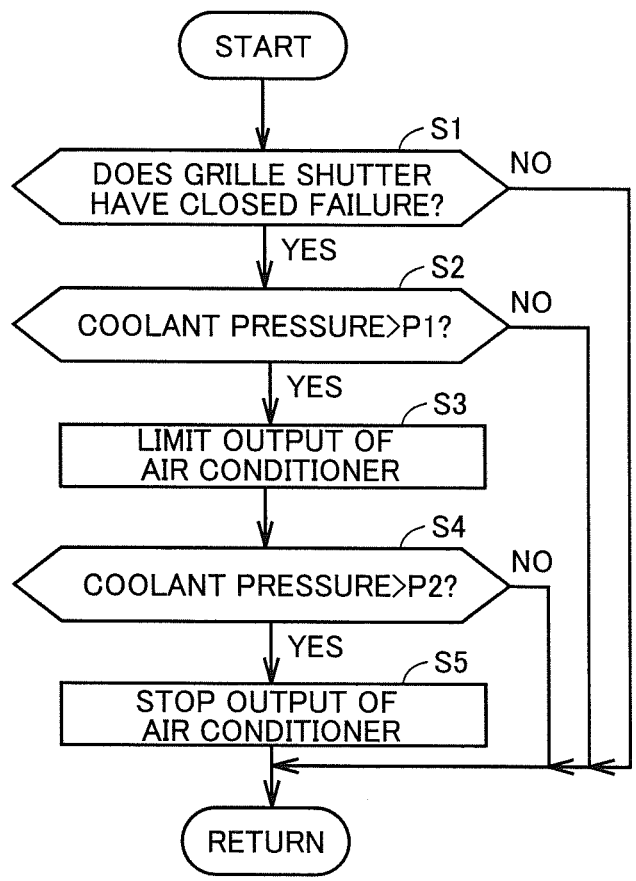
FIG. 2 is a flowchart for illustrating processing performed for the closed failure of a grille shutter.

FIG. 2 is a flowchart for illustrating processing performed for the closed failure of the grille shutter. The processing in this flowchart is performed as a subroutine invoked from a predetermined main routine. Further, the processing in this flowchart is performed by control unit 400 shown in FIG. 1.

Referring to FIGS. 1 and 2, first, in step S1, it is determined whether or not grille shutter 120 has the closed failure. This determination is made, for example, based on a sensing result of sensor 122. When grille shutter 120 has the closed failure (YES in step S1), the processing proceeds to step S2. On the other hand, when grille shutter 120 does not have the closed failure (NO in step S1), the flowchart of FIG. 2 ends and the processing returns to the main routine.

In step S2, it is determined whether or not the pressure of the coolant which flows through air conditioner unit 300 (coolant pressure) is higher than P1 as the first predetermined value. When the coolant pressure is higher than P1 (YES in step S2), the processing proceeds to step S3. On the other hand, when the coolant pressure is less than or equal to P1 (NO in step S2), the flowchart of FIG. 2 ends and the processing returns to the main routine.

In step S3, an output of air conditioner unit 300 is limited. Specifically, the rotational speed of compressor 310 is limited. It is noted that, when the rotational speed of compressor 310 is already limited, the limited rotational speed is maintained. Thereafter, the processing proceeds to step S4.

In step S4, it is determined whether or not the coolant pressure is higher than P2 as the second predetermined value. P2 is a value higher than P1 used in step S2. When the coolant pressure is higher than P2 (YES in step S4), the processing proceeds to step S5. On the other hand, when the coolant pressure is less than or equal to P2 (NO in step S4), the flowchart of FIG. 2 ends and the processing returns to the main routine.

In step S5, the output of air conditioner unit 300 is stopped. Specifically, the operation of compressor 310 is stopped. It is noted that, when the operation of compressor 310 is already stopped, the stopped state is maintained. After the processing in step S5 is completed, the flowchart of FIG. 2 ends and the processing returns to the main routine.

According to the flowchart of FIG. 2, when grille shutter 120 has a closed failure, the output of air conditioner unit 300 is limited in a stepwise manner in accordance with the pressure of the coolant which flows through air conditioner unit 300. When the output of air conditioner unit 300 is limited, the SOC of HV battery 200 is suppressed from decreasing. As a result, opportunities that motor generator MG1 is driven by engine 110 are decreased, suppressing an increase in the temperature within engine compartment 100 due to heat generation by engine 110.

Finally, the embodiment of the present invention will be summarized.

Referring to FIG. 1, hybrid vehicle 10 in accordance with the embodiment includes engine 110, a motor, and a power generator (motor generators MG1 and MG2). Hybrid vehicle 10 includes: a battery (HV battery 200) which is charged by engine 110 driving the power generator (motor generator MG1) when a remaining capacity (SOC) decreases; engine compartment 100 which accommodates engine 110 and the motor (motor generators MG1 and MG2); a shutter (grille shutter 120) which is provided at vent 600 for taking in air from outside of hybrid vehicle 10 into engine compartment 100, and which is openable and closable; an air conditioner (air conditioner unit 300) which includes an electrically powered compressor (compressor 310) driven by receiving electric power from the battery (HV battery 200); and control unit 400 which limits an output of the electrically powered compressor (compressor 310) when the shutter (grille shutter 120) has a closed failure in which the shutter cannot be set to an opened state.

Preferably, the air conditioner (air conditioner unit 300) further includes a coolant. As shown in FIG. 2, when the coolant has a pressure higher than a first predetermined value (P1) (YES in step S2), control unit 400 decreases the output of the electrically powered compressor (compressor 310) (step S3). When the coolant has a pressure higher than a second predetermined value (P2) (YES in step S4), control unit 400 stops the electrically powered compressor (compressor 310) (step S5). The second predetermined value (P2) is higher than the first predetermined value (P1).

Preferably, control unit 400 limits a rotational speed of the electrically powered compressor (compressor 310) when the shutter (grille shutter 120) has the closed failure.

It should be understood that the embodiment disclosed herein is illustrative and non-restrictive in every respect. The scope of the present invention is defined by the scope of the claims, rather than the above description of the embodiment, and is intended to include any modifications within the scope and meaning equivalent to the scope of the claims.

REFERENCE SIGNS LIST

MG1, MG2: motor generator; 10: hybrid vehicle; 100: engine compartment; 110: engine; 111: engine radiator; 120: grille shutter; 121: actuator; 122: sensor; 150: electrically powered driving unit; 151: HV radiator; 161, 162, 360: inverter; 170: motive power split device; 200: HV battery; 300: air conditioner unit; 310: compressor; 320: evaporator; 330: expansion valve; 340: condenser; 350: thermistor; 370: pressure sensor; 400: control unit; 500: drive wheel; 600: vent.

The invention claimed is:

1. A hybrid vehicle comprising:
an engine,
a motor generator, the engine and the motor generator being accommodated in an engine compartment of the hybrid vehicle;
a battery configured to be charged by the motor generator driven by the engine when a remaining capacity of the battery decreases;
a shutter provided at a vent, the shutter being configured to take in air from outside of the hybrid vehicle into the engine compartment, and the shutter being configured to open and close;
an air conditioner including an electrically powered compressor, the electrically powered compressor being configured to be driven by receiving electric power from the battery; and
an electronic control unit configured to limit an output of the electrically powered compressor when the shutter has a closed failure in which the shutter cannot be set to an opened state.

2. The hybrid vehicle according to claim 1, wherein
the air conditioner further includes a coolant,
the electronic control unit is configured to decrease the output of the electrically powered compressor when the coolant has a pressure higher than a first predetermined value,
the electronic control unit is configured to stop the electrically powered compressor when the coolant has a pressure higher than a second predetermined value, and
the second predetermined value is higher than the first predetermined value.

3. The hybrid vehicle according to claim 1, wherein
the electronic control unit is configured to limit a rotational speed of the electrically powered compressor when the shutter has the closed failure.

* * * * *